United States Patent [19]
Schloss et al.

[11] Patent Number: 5,692,125
[45] Date of Patent: Nov. 25, 1997

[54] SYSTEM AND METHOD FOR SCHEDULING LINKED EVENTS WITH FIXED AND DYNAMIC CONDITIONS

[75] Inventors: Robert Jeffrey Schloss, Briarcliff Manor; Linda Sue Tetzlaff, Mt. Kisco, both of N.Y.

[73] Assignee: International Business Machines Corporation, Armonk, N.Y.

[21] Appl. No.: 438,153

[22] Filed: May 9, 1995

[51] Int. Cl.[6] .................................................. G06F 17/60
[52] U.S. Cl. ........................................ 395/209; 395/208
[58] Field of Search ................................. 395/201, 208, 395/209, 672, 673, 670, 963; 434/108; 364/468.01

[56] References Cited

U.S. PATENT DOCUMENTS

| | | | |
|---|---|---|---|
| Re. 32,655 | 4/1988 | Levine | 368/29 |
| 3,633,298 | 1/1972 | Grier, Jr. | 40/82 |
| 3,964,195 | 6/1976 | Jordan | 40/107 |
| 3,999,050 | 12/1976 | Pitroda | 235/152 |
| 4,162,610 | 7/1979 | Levine | 58/148 |
| 4,573,127 | 2/1986 | Korff | 364/493 |
| 4,712,923 | 12/1987 | Martin | 368/10 |
| 4,769,796 | 9/1988 | Levine | 368/29 |
| 4,783,800 | 11/1988 | Levine | 379/67 |
| 4,794,711 | 1/1989 | Christensen | 40/122 |
| 4,807,154 | 2/1989 | Scully et al. | 364/518 |
| 4,817,018 | 3/1989 | Cree et al. | 364/518 |
| 4,819,191 | 4/1989 | Scully et al. | 364/518 |
| 4,881,179 | 11/1989 | Vincent | 364/518 |
| 5,050,077 | 9/1991 | Vincent | 364/401 |
| 5,070,470 | 12/1991 | Scully et al. | 364/705.08 |
| 5,093,854 | 3/1992 | Sucato | 379/67 |
| 5,097,429 | 3/1992 | Wood et al. | 364/569 |
| 5,113,380 | 5/1992 | Levine | 368/10 |
| 5,129,057 | 7/1992 | Strope et al. | 395/161 |
| 5,197,000 | 3/1993 | Vincent | 364/401 |
| 5,200,891 | 4/1993 | Kehr et al. | 364/413.01 |
| 5,247,438 | 9/1993 | Subas et al. | 364/400 |
| 5,260,868 | 11/1993 | Gupta et al. | 364/402 |

*Primary Examiner*—Gail O. Hayes
*Assistant Examiner*—Frantzy Poinvil
*Attorney, Agent, or Firm*—Louis J. Percello

[57] ABSTRACT

In a scheduling system, events and/or groups of events are checked at a scheduling time to insure that certain fixed conditions associated with the event(s) are satisfied. The events are also checked at one or more times, between scheduling time and a performance time (when the event(s) are to be performed), called "prepare to perform time(s)." At the prepare to perform time(s), certain dynamic conditions and/or data associated with the events are checked to determine whether the dynamic conditions are satisfied. If the dynamic conditions are satisfied, the event(s) are confirmed for performance. If one or more of the dynamic conditions are not satisfied, the event(s) are modified. Events can be modified by cancelling, altering or postponing. When an event(s) is modified, a notification can be sent out. Further, a modification of a event(s) can cause modifications to one or more subsequent events in the event group (propagation.) Templates are event groups with some omitted information that is provided by a user at scheduling time. Templates are used to facilitate the scheduling of common events and/or event groups.

24 Claims, 16 Drawing Sheets

FIG. 11B

| | | |
|---|---|---|
| 1116 (ILLEGAL DAYS) | (ILLEGAL DAYS) | (ILLEGAL DAYS) |
| 1117 (ILLEGAL ADJUSTMENT RULE) | (ILLEGAL ADJUSTMENT RULE) | (ILLEGAL ADJUSTMENT RULE) |
| 1118 MONDAY | 1138 WEDNESDAY | 1158 FRIDAY |
| 1119 EXTERNAL CONDITION(S) AND ADJUSTMENT RULE(S) | EXTERNAL CONDITION(S) AND ADJUSTMENT RULE(S) | EXTERNAL CONDITION(S) AND ADJUSTMENT RULE(S) |
| 1120 INTERVAL(S) BEFORE FOLLOWING EVENTS=2 DAYS | 1140 INTERVAL(S) BEFORE FOLLOWING EVENTS=2 DAYS | 1160 (INTERVAL(S) BEFORE FOLLOWING EVENTS) |
| 1121 RECURRING FLAG=TRUE | 1141 RECURRING FLAG=TRUE | 1161 RECURRING FLAG=TRUE |
| 1122 REPETITION INTERVAL=WEEKLY | 1142 REPETITION INTERVAL= WEEKLY | 1162 REPETITION INTERVAL=WEEKLY |
| 1123 10 | 1143 10 | 1163 10 |
| 1124 (LAST RECUR DATE) | (LAST RECUR DATE) | (LAST RECUR DATE) |
| 1125 NURSE SMITH | 1145 NURSE SMITH | 1145 NURSE SMITH |
| 1126 | | |
| 1127 PTR TO OPTIONAL ADDITIONAL INFORMATION | PTR TO OPTIONAL ADDITIONAL INFORMATION | PTR TO OPTIONAL ADDITIONAL INFORMATION |

1183

SUGGESTED DAY
REPETITION COUNT
INSERTED BY
PTR TO EVENT GROUP

SYSTEM AND METHOD FOR SCHEDULING LINKED EVENTS WITH FIXED AND DYNAMIC CONDITIONS

FIELD OF THE INVENTION

This invention relates to computer assisted calendaring of events. More specifically, the invention relates to scheduling events and groups of events in a way that satisfies temporal relationships and external conditions.

BACKGROUND OF THE INVENTION

Computer-assisted scheduling of future events is used in personal information management software to handle items such as appointments, checkpoints and deadlines. It is used in group calendar software to handle tasks such as finding a mutually convenient time for a meeting, and to reserve a meeting room. It is used in optimizing the utilization of manufacturing facilities while minimizing product fabrication time. It is used in project management applications, where dependencies between events and dependencies on particular resources (work hours, availability of particular machines or particular classes of workers, etc.) over many days, weeks or months are taken into consideration in scheduling a project, such as construction of a building.

The simplest computer-assisted scheduling simply uses the computer as a storage medium. All decisions about when and how an event should occur are made by end users, who simply find the computer a convenient way of storing and retrieving and distributing calendar information as an aid to their own planning. Such systems are found in watches, personal organizers, and in simple scheduling software.

Slightly more advanced computer-assisted scheduling uses the computer to do some portion of the scheduling. For example, a sequence of events may be specified by the user with a starting date and time for the first event after which the computer schedules the remaining events. Or the computer is given the required completion date, and schedules "backwards" to tell when the first event must start. Repeating events, such as weekly meetings or quarterly tax payments can be entered by the user once.

More advanced computer-assisted scheduling allows additional information to be associated with each event, consisting of one or both of: free-form information, only stored by the computer but not acted upon, and fixed field information, such as required resources, meeting location, names of individuals involved in the event, etc. It may also permit some global restrictions on scheduling, such as "no meetings on weekends for this project". These scheduling programs may tell the user that a schedule of interrelated events planned are not feasible (e.g. more carpenters are needed for event 16 than will be available on the day it is to happen) and may "relax" or "adjust" the schedule to one that can be performed. It may also store clusters of events related to one functional result (e.g. "process for manufacturing desktop computer model 3 in 27 steps") so that scheduling them repeatedly (e.g. as each new order arrives) requires less input by an end-user.

STATEMENT OF PROBLEMS WITH THE PRIOR ART

Much of the prior art does not allow for scheduling an event and/or cluster of one or more events where one or more of these events can be cancelled, postponed, and/or modified as a function of external data and/or conditions. In addition, the prior art fails to automatically cancel, postpone, and/or alter events as a function of dynamic external data and/or conditions after the event has been scheduled but before the event is to be performed. (Dynamic data and/or conditions are those data and/or conditions that can changed after an event is scheduled but before it is to be performed.) Accordingly, the prior art does not allow the propagation of these cancellations and postponements of events throughout a schedule containing these events. The prior art also fails to notify users when these cancellations, postponements, and/ or modifications occur.

OBJECTS OF THE INVENTION

An object of the invention is an improved system and method for computer scheduling of events and event groups.

An object of the invention is an improved system and method for computer scheduling of events and event groups that allows a scheduler to schedule events at a schedule time and to account for changing external data and conditions that occur between the schedule time and an event performance time.

Another object of the invention is an improved system and method for computer scheduling of events and event groups that allows a scheduler to schedule partially defined events and/or groups of events.

SUMMARY OF THE INVENTION

This is a system and method that schedules one or more events or event groups subject to conditions. The events are checked at a scheduling time (when the event(s) and/or event groups are scheduled) to insure that certain fixed conditions associated with the event(s) are satisfied. The events are also checked at one or more times, between scheduling time and a performance time (when the event(s) are to be performed), called "prepare to perform time(s)". At the prepare to perform time(s), certain dynamic conditions (data) associated with the events are checked to determine whether the dynamic conditions (data value ranges) are satisfied. If the dynamic conditions (data) are satisfied, the event(s) are confirmed for performance. If one or more of the dynamic conditions (data) are not satisfied, the event(s) are modified. Events can be modified by cancelling, altering or postponing. When an event(s) is modified, a notification can be sent out. Further, a modification of a event(s) can cause modifications to one or more subsequent events in the event group (propagation.)

Templates are event groups with some information missing. Templates can be used to facilitate the scheduling of common events and/or or event groups. This is normally done by having a domain expert, e.g, a doctor, provide some essential information in the template during the template design. At the schedule time, the omitted information can be provided by a user with less expertise then the domain expert. Instead of omitting the template information, the domain can provide default or recommended information, like typical values, to assist the user.

BRIEF DESCRIPTION OF THE DRAWINGS

FIG. 10, comprising

DETAILED DESCRIPTION OF THE INVENTION

Figure 1:
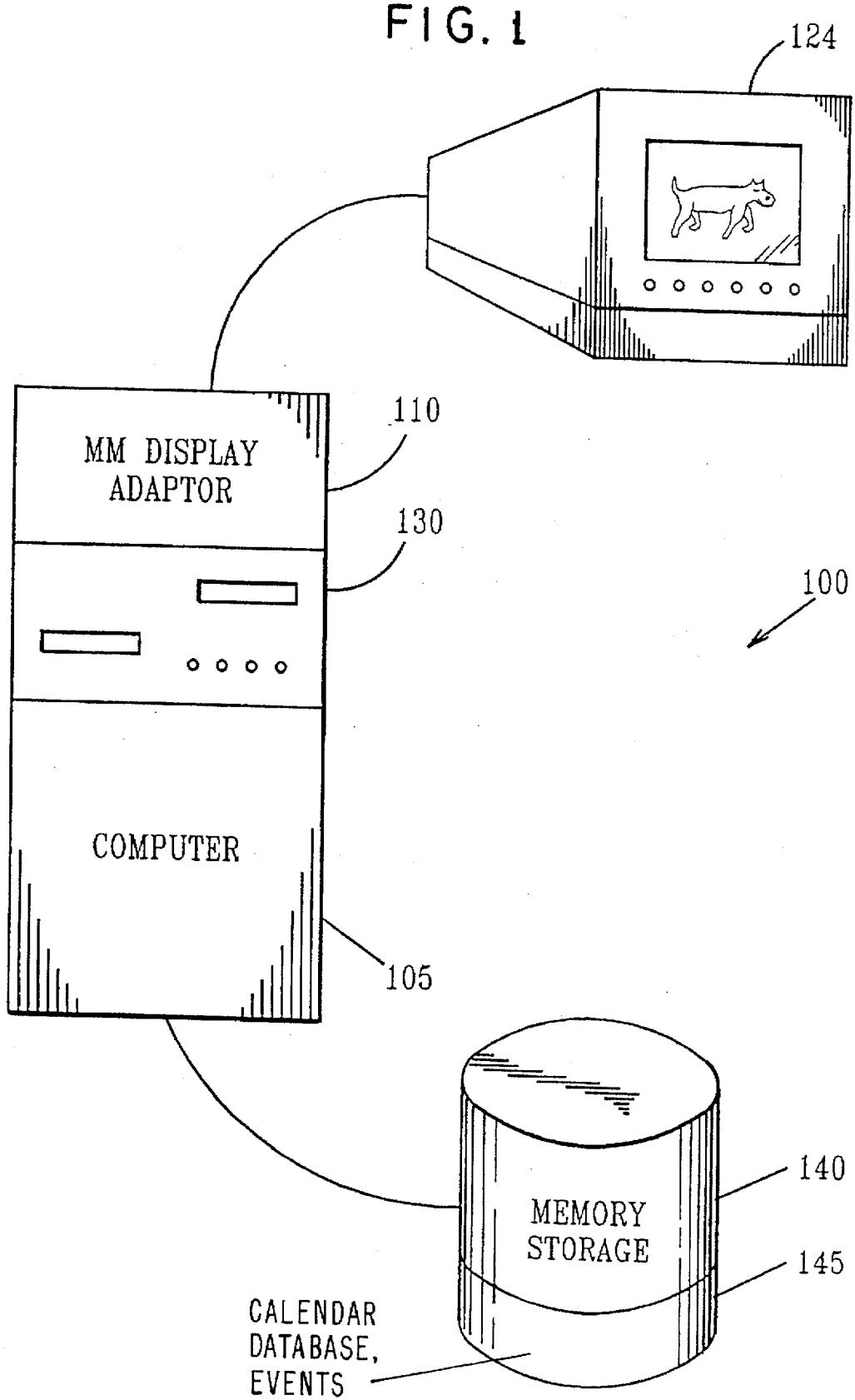
FIG. 1 is a block diagram of one preferred computer system which embodies the present invention.

The present invention is capable of running on any general purpose computer system. One preferred embodiment 100, that is shown as a block diagram in FIG. 1, uses an IBM Personal System/2 (PS/2) Model 8595 Microchannel Floor Standing 486 System 105 (described in the Quick Reference supplied with the system unit). An IBM Personal System/2 (PS/2) Display Adapter 110 is used for video playback, for example on a graphical interface 124. This preferred embodiment also uses an IBM Operating System/2 (OS/2) 2.1 (described in the OS/2 2.1 Quick Reference), and a Smalltalk/VPM (described in the Smalltalk/VPM Tutorial and Programming Handbook). Other multimedia hardware 130 known in the art that can be connected to a general purpose computer can also be used. This hardware 130 may include video cassette recording devices, laser disc player adapters, audio capture playback adapters, etc. The marks OS/2 and PS/2 are trademarks of the IBM Corporation, and the mark Smalltalk/VPM is a trademark of Digitalk, Inc..

Any memory storage apparatus 140 well known in the art operates with the computer system 100. A calendar database 145 with one or more events resides on the memory storage 140.

Figure 2:
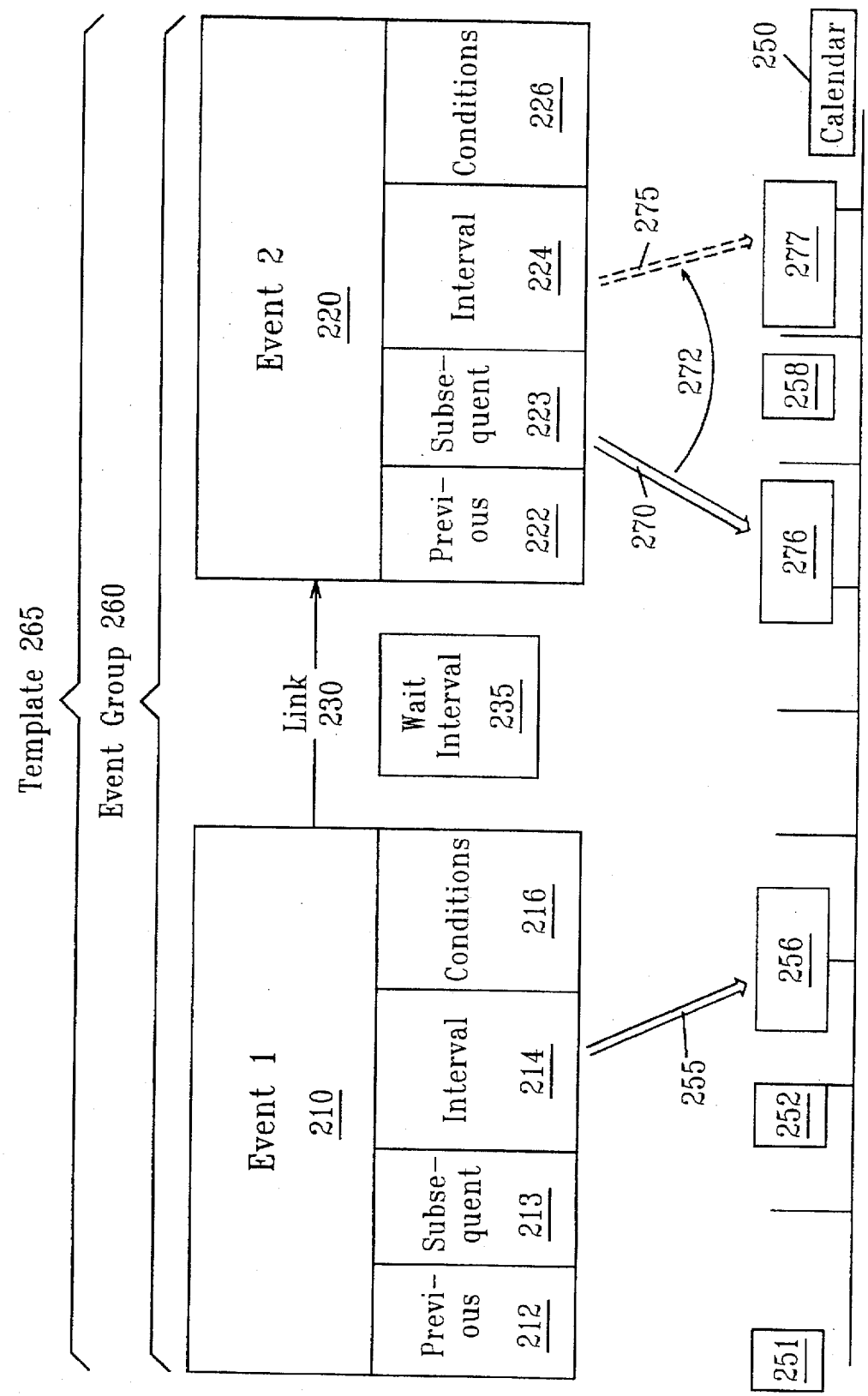
FIG. 2 is a block diagram showing two events in an event group being scheduled.

FIG. 2 is a block diagram showing two events (210, 220) in an event group 260 being scheduled.

FIG. 2 shows the main components of a simple event group 260 which contains two events. An event (210, 220) is any occurrence to be scheduled. For example, an event can be: 1. organize tax records before Feb. 15, 1995, 2. take 2 aspirin at 5 o'clock, 3. etc. An event group 260 is one or more events that are logically related (e.g. in some sequential order) that are to be performed together to accomplish a purpose. For example, 1. file taxes, 2. cure sickness, etc. A protocol is specific process of more than one events and/or event groups 260 that are logically related and are performed to achieve a purpose. Just as a single event can be scheduled by a scheduler at schedule time, a protocol (or more than one related events) can be scheduled to occur or reoccur for different applications. For example, a protocol might be to give 2 aspirins daily for 4 days and on the fifth day apply a cold compress. This protocol could be designed by a health care provider to treat tendenitis. Therefore, anyone diagnosed as have tendenitis might be assigned this predefined protocol for a treatment. See also the description of FIG. 11 below.

In one preferred embodiment, event 1 (210) contains 17 fields (see FIG. 3) describing the event and the requirements to be honored when it is scheduled and performed. Event 2 (220) contains 17 fields describing the event and the requirements to be honored when it is scheduled and performed. Events are scheduled at a time called schedule time.

The event group 260 comprises event 1 (210) and event 2 (220) which are logically related. In this case the logical relation is that event 1 occurs (i.e, is scheduled to occur at schedule time) before event 2. In one preferred embodiment, the logical relation is defined by previous (212, 222) and subsequent (213, 223) event pointers.

In the example shown in FIG. 2, event 1's previous event pointer 212 pointing to a previous event would be null and event 1's subsequent event pointer 213 pointing to a subsequent event would point to event 2 (220). Likewise, event 2's previous event pointer 222 would point to event 1 and event 2's subsequent event pointer 223 would be null. The data in 213 and 222 defines a logical relationship between events 1 and 2 in the event group 260 and establishes a subsequence link 230 between the two events (210, 220).

In a preferred embodiment, block 214 specifies the time interval, e.g. the number of days, that passes after Event 1 occurs before Event 2 should occur. The time interval specified in block 214 specifies a wait interval condition 235. The wait interval condition 235 is part of the logical relationship of this event group 260. Because in this example, event 2 is the last event, its interval block 224 is null. If block 214 contains the value 0, both events would be scheduled at the same time, e.g. on the same day.

Figure 9:
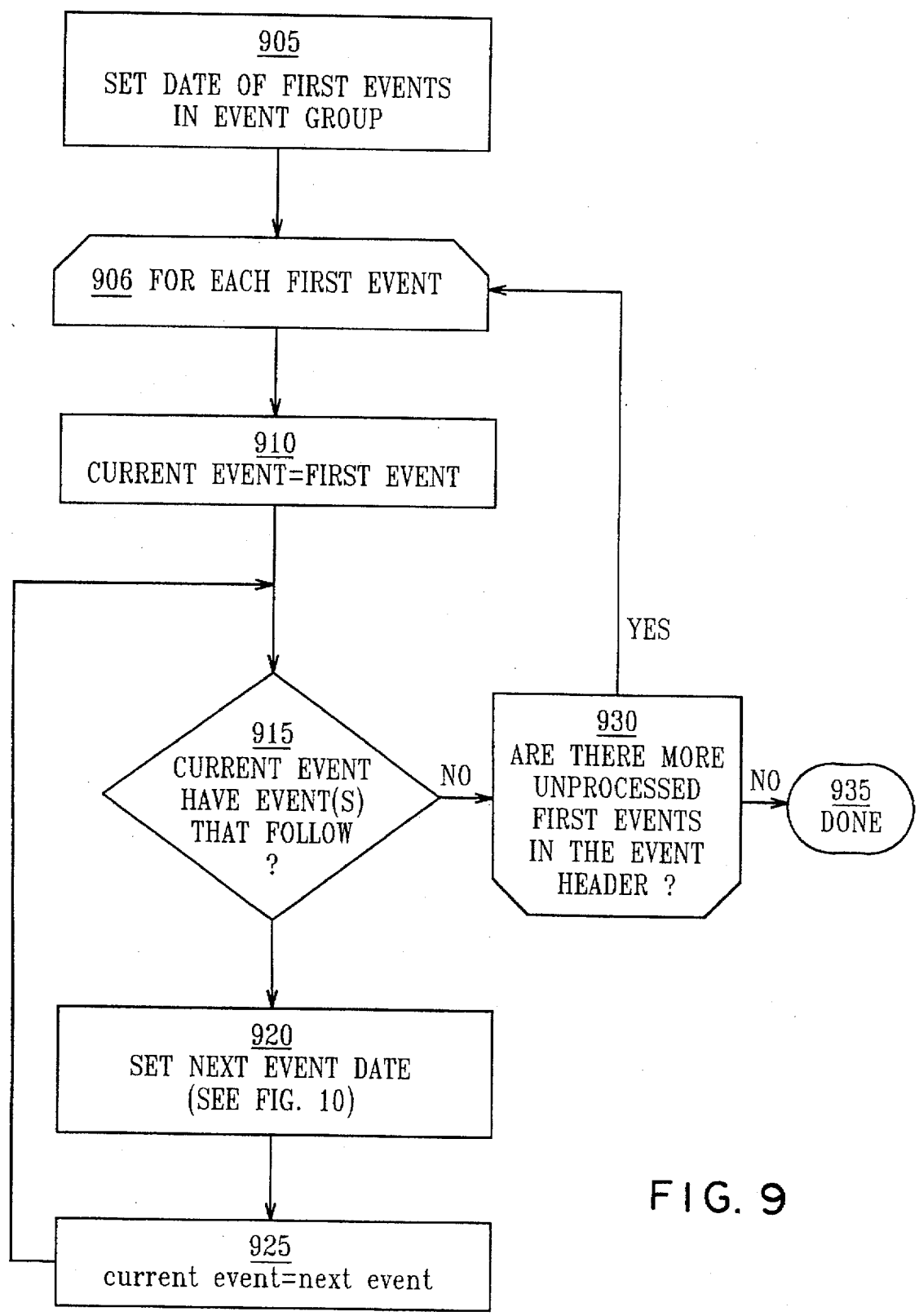
FIG. 9 is flow chart showing the steps performed by the system at scheduling time.

There are fixed conditions that must be honored in scheduling event 1 at the scheduling time 251 (See FIG. 9). These fixed conditions must be checked before event 1 is scheduled 255. These fixed conditions are specified in block 216. Also, there are fixed conditions that must be honored in scheduling event 2 and checked before it is scheduled. These conditions are specified in 226. Fixed conditions are conditions (and/or data) that can be known at scheduling time 251 (when the user and/or system defines or redefines the schedule). An Example of a fixed condition is that an event of type X can not be performed on a Sunday.

There are dynamic conditions that must be checked (at a prepare to perform time 252, 258) and honored before performing event 1 at the performance time 256. Performance of the event typically involves sending a message to prompt the performance of the event. For example, a nurse might receive one or more messages detailing events, like administer medication to one or more patients the morning of the day of administration. These dynamic conditions must be checked before event 1 is performed (at time 256). These dynamic conditions are specified in block 216. Also, there are dynamic conditions that must be checked at a prepare to perform time 258 and honored before performing event 2 at the event 2 performance time 277. These conditions are specified in 226.

A prepare to perform time (252, 258) might be the time before event performance at which all external data influencing the dynamic condition(s) is available. For example, a prepare to perform time (252, 258) might be the night before a medication is administered but after the data of blood count of a patient is available.

Dynamic conditions are conditions (and/or data) that can vary between the schedule time 251 and the performance time (256, 277). Typically, whether the dynamic condition is satisfied or not can not be determined until close to performance time.

Event groups 260 can be defined as a template 265. A template 265 is one or more events or event groups that can be scheduled at schedule time for general use. Templates typically have missing information to make them more general. For instance, a template of the event group in FIG. 2 might not have a repeat count (see block 370 in FIG. 3). This missing information would be added to the template to specialize the event group to a specific person, application or situation. As an example, a template might exist for a construction schedule defined by an event group 260 for painting a building which would detail a first event 210 (spackle walls), a second event 220 (paint walls) with a wait interval 235 of 3 days between events. In the template, no starting time of the first event 210 is specified. To apply the template to painting a specific room, the start date (day) would be designated 255 in the template. There performance of the specific tasks would then be mapped (255, 270) by the template. For example, the spackling would start 256 on Monday the 15th and the painting would start 276 three days later on the electronic calendar 250.

Mapping (255, 270, 272, 275, see FIG. 9) of events (210, 220) or an event group 260 is done by the system 100 at schedule time 251 if all of the fixed conditions associated with each the events (210, 220) are satisfied. Mapping places events (210, 220) on the calendar 250. In other words, the start date 320 and/or other dates of the event are identified on the calendar 250 as being associated with the event (210, 220). The times on the calendar can be tracked by methods well known in the art, e.g. using the operating system clock of system 100.

The electronic calendar 250 is a database that contains events and event groups and optionally contains templates. Adding, removing or modifying events in a calendar is done by sending requests or orders to the calendar database, and the particular data added, modified or removed could be supplied by a user using a calendar software application. In one example of such an application, the user could drag a visual representation, such as the name, of a template of an event group to a start date on a conventional graphic representation of a monthly calendar as a way of requesting that the event group be scheduled to start on that date. If the program described in FIGS. 9 and 10 determines that the event group cannot be scheduled properly if started on that date, a visual or audio indication would be given to the user, otherwise, the monthly calendar graphic would show words or symbols on each date that had an event in the event group scheduled on that date.

Templates 265 are events or event groups 260 that have information omitted. The event group 260 is created as a template 265 to represent a common sequence to be scheduled at an unspecified time. Here the omitted information of the template 265 includes the event start dates (256, 276). Other things can also be omitted (see below.) The actual dates selected at schedule time 251 by the user, and at event performance time (256, 277), must honor the conditions in blocks 216 and 226. For example, if event 1 is "prep for surgery," event 2 is "surgery," and the user schedules the event group to begin on a particular date 255, the invention can schedule event 2 (220) while respecting interval wait requirements 235 and fixed conditions 342 (included in 226), e.g., that the surgery department is closed on Sundays. If "surgery" cannot start based on dynamic conditions (see 350 in FIG. 3), such as blood test values in a certain range, and these were part of event 2's conditions (included in 226), then the invention could reschedule (postpone 272) event 2 to a later date 275.

Figure 3:
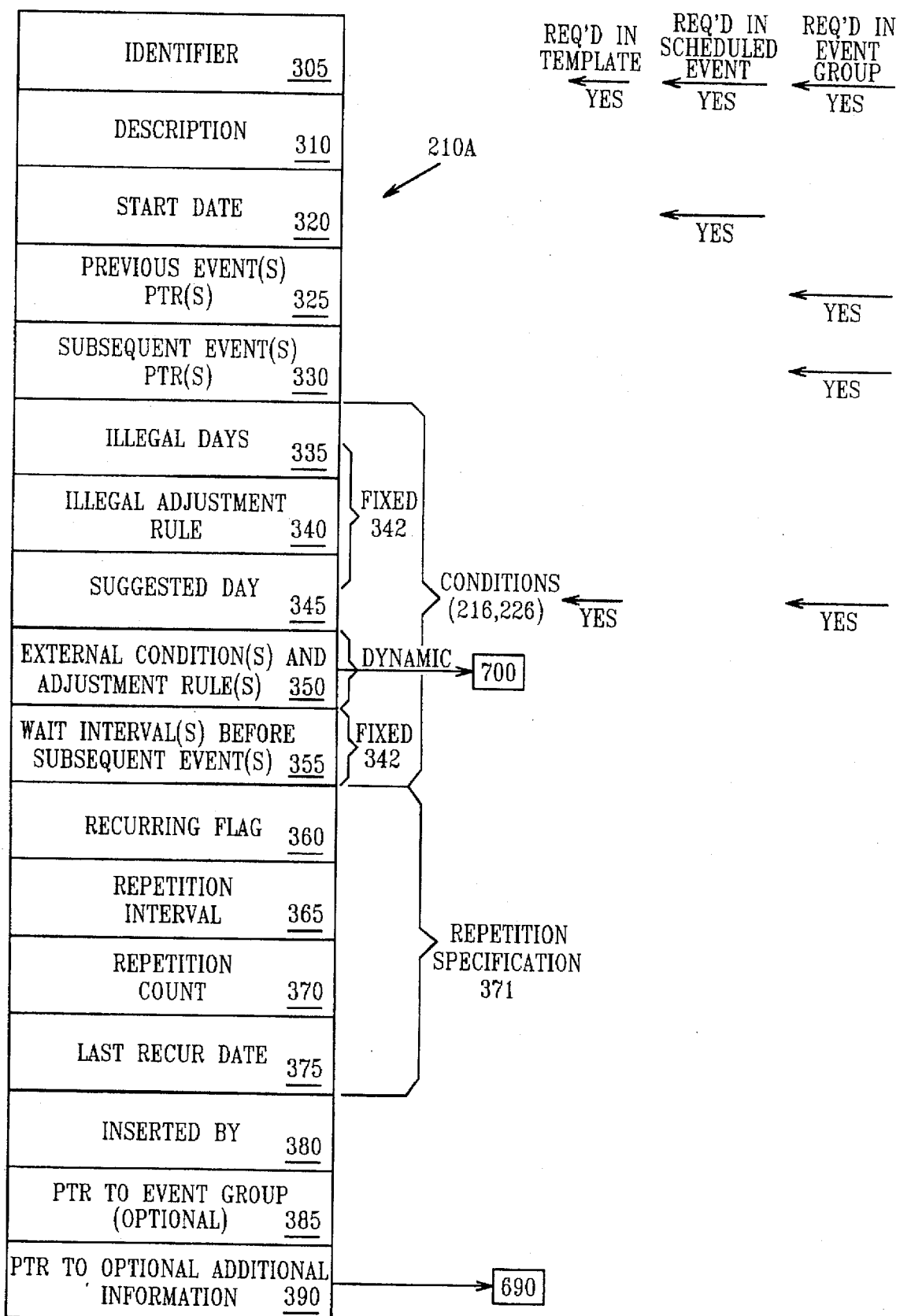
FIG. 3 is a block diagram of a preferred event data structure.

FIG. 3 is a block diagram of a preferred event data structure 210A.

The identifier block 305 is a short character string description of the function of the event 210. For example, in one preferred embodiment, an event 210 would be a requirement to take vitamin B on Mondays, 3 pills. In this case the identifier might be "VitB 3 M". In alternative embodiments, event 210 stands for Payment of Estimated Income Taxes Quarterly. In this case the identifier might be "Pay EstTax". These two non limiting examples (a medical domain and an accounting domain), are carried through in the following block descriptions.

The description block 310 is an arbitrarily long character string description of the function of event 210. In the example preferred embodiment, the description might be "Vitamin B 100 MG 3 Tablets Mondays." In the example alternative embodiment, the description might be "Pay Quarterly Estimated Income Tax".

The start date block 320 is the date on which the event is to be performed. An event data structure 210A which is a template (see below), or which is part of an event group template, would ignore this field until the template is used, e.g., to schedule a real event. In some embodiments, time-of-day is included as part of date. In the medical example, the start date might be Oct. 24, 1994. In the accounting example, the start date might be Jan. 15, 1995.

The previous event(s) pointer block 325 is used when events are linked in sequence as part of an event group. This block is null for the first event of a series of linked events. See blocks 212 and 222 in FIG. 2.

The subsequent event(s) pointer, block 330, is used when events are linked in sequence as part of an event group. Block 330 is null in an event that is the last event in a series of linked events. See blocks 213 and 223 in FIG. 2.

The illegal days block, 335, is a collection of times, e.g., dates and/or names of days of the week, during which this event must not be scheduled or performed. This fixed (also called static) condition is used at schedule time and will be honored when the template is used to schedule the event in a specific application. In the examples, the illegal days block is null.

The illegal adjustment rule block 340 indicates one of five actions that may be done at event scheduling time, if the user requests that the event be scheduled at a time (day) that block 335 indicates is illegal. The actions are: inform user that scheduling is invalid and stop; schedule the event nearest to the user's desired date earlier than the user's desired date; schedule the event nearest to the user's desired date later than the user's desired date; schedule the event as near as possible to the user's desired date, either earlier or later than the user's desired date and if both are equally close, chose the earlier; schedule the event as near as possible to the user's desired date, either earlier or later than the user's desired date and if both are equally close, chose the later. In the examples the illegal adjustment rule block is null.

The suggested day block 345 is the name of a day of the week on which the event should be scheduled. In the medical example, the suggested day is Monday. In the accounting example, the suggested day is null.

Blocks 335, 340, 345 and 355 contain information called fixed conditions 342.

The pointer to external condition(s) and adjustment rule(s) block 350 links zero or more external conditions (also called dynamic conditions and/or data) that must be satisfied before the event is performed. FIG. 7 details how these conditions are specified and what action is to be taken when the conditions are not satisfied. In the medical example, the pointer could point to an external condition that specifies that the vitamin should not be taken if the blood count is in a certain range. In the accounting example, the pointer would be null. These external conditions 350 are dynamic.

The wait interval(s) block 355 (see block 235) specifies an integer for each pointer to a subsequent event(s) that was part of block 330. The integer indicates the time, e.g., number of days, after this event that those following events would normally be scheduled. In these examples, the interval is zero, since there are no following events. (FIG. 2 shows an example of a non zero wait interval 235).

Blocks 360, 365, 370, and 375 specify how often an event, e.g. 210, is repeated 371. The repetition specification 371 allows the event and/or event group to be repetitively scheduled easily.

The recurring flag block 360 indicates if the event recurs on a regular basis, or if it is a one-time event. In the medical example, the recurring flag would be true, since the vitamin is to be taken weekly. In the accounting example, the recurring flag would be true, since estimated taxes are due quarterly.

The repetition interval block 365 indicates the frequency that the event recurs with. Example are: daily, weekly, monthly, yearly, daily on weekdays, every three months. In the medical example, the repetition interval is weekly. In the accounting example, the repetition interval is every three months.

The repetition count block 370 is an integer and specifies for how many days, weeks, months, years the event will recur. If it should recur until a specified date or indefinitely, this block contains zero. In the medical example, the repetition count might be 10, if the physician wants the vitamin booster taken for ten weeks. In the accounting example, the repetition count might be 0, because taxes are due every quarter from now on.

The last recur date block 375 is a date (or null). When the repetition count is zero, the event will recur up to and including this date. If this is null (and repetition count is zero), the event will recur indefinitely. In the medical example, the last recur date would be null, since repetition count was used to bound the event recurrence. In the accounting example, the last recur date would be null, since taxes must be paid every quarter from now on.

The "inserted by" block 380 is a string which indicates who scheduled the event. In the medical example, the inserted by field could be "Doctor Smith". In the accounting example, the inserted by field could be "Joe Taxpayer". This block is used in application domains where multiple users, e.g., individuals, organizations or projects, add events to the same calendar.

Figure 11A:
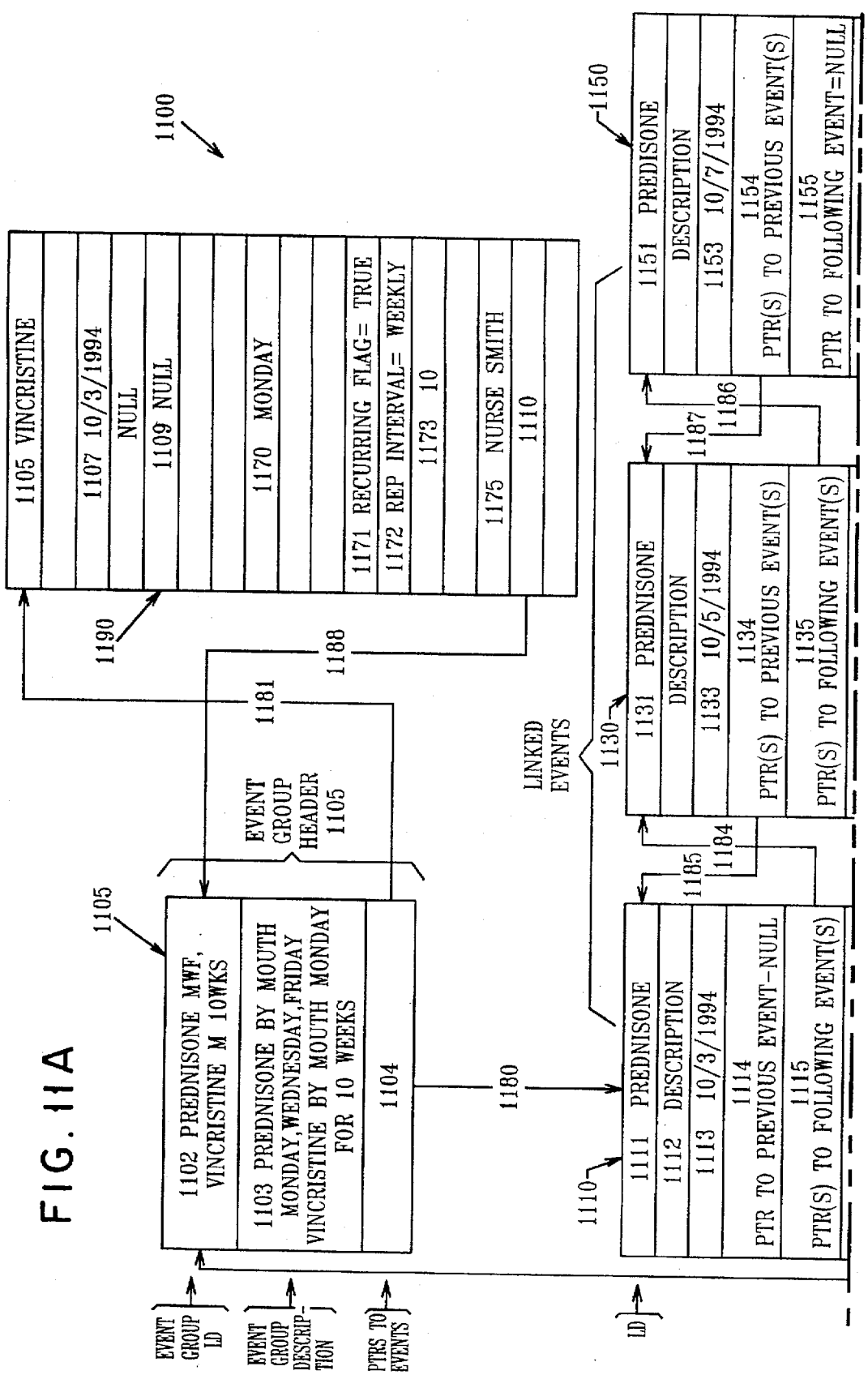
FIG. 11 is a block diagram of an example event group showing linkages.

The pointer to event group header block 385 is null if this is a single event, but points to an event group header if this event is part of an event group 260 and is the first event of a precedence/subsequence chain of linked events. In the medical example, the pointer would be null if the vitamin regimen was the entire scheduled treatment. But if the physician prescribes vitamins and something else as a package, he may create an event group template and in this case, this pointer would link to the header, whose identifier might be "Vitamins and Extra Water". In the accounting example, the pointer could be null. FIG. 11 shows this field in use, in blocks 1126 and 1110. This field would permit software to identify the event group from a particular event without scanning every event group header (1105) and body.

The pointer to optional additional information block 390 is a pointer to additional information. This can be used if block 350 specifies external, i.e. dynamic, conditions. In the medical example, the pointer could point to the patient data object. In the accounting example, the pointer could point to the individual tax account data object.

In one preferred embodiment, the data structure 210A can be used to define an event 210, and event group 260, or a template 265. The determination is made by examining what information is provide in the fields of the data structure 210.

To use data structure 210A to describe an event, only the identifier field 305 has to contain information. However, other information can be provided. For example, conditions (216, 226) are normally specified, since this enables flexible intelligent scheduling. Typically, a domain expert, e.g., a doctor, provides some information (including field 305) in a template and omits some information. The domain expert does this prior to scheduling time 251. The omitted information is provided by a user at scheduling time 251. The user may have a lower level of expertise.

If the event is scheduled, the start date 320 in addition to the identifier 305 must be supplied. This can be done at scheduling time 251 or the identifier 305 could have been supplied prior to this.

If the event is part of an event group, each event 210 in the event group 260 will require the identifier 305 and either previous event(s) pointer(s) 325 and/or subsequent event(s) pointers 326 with wait interval(s) 355. Alternatively, a pointer to event group header (385) must be supplied, so that the system knows what other events it is grouped with.

Figure 4:
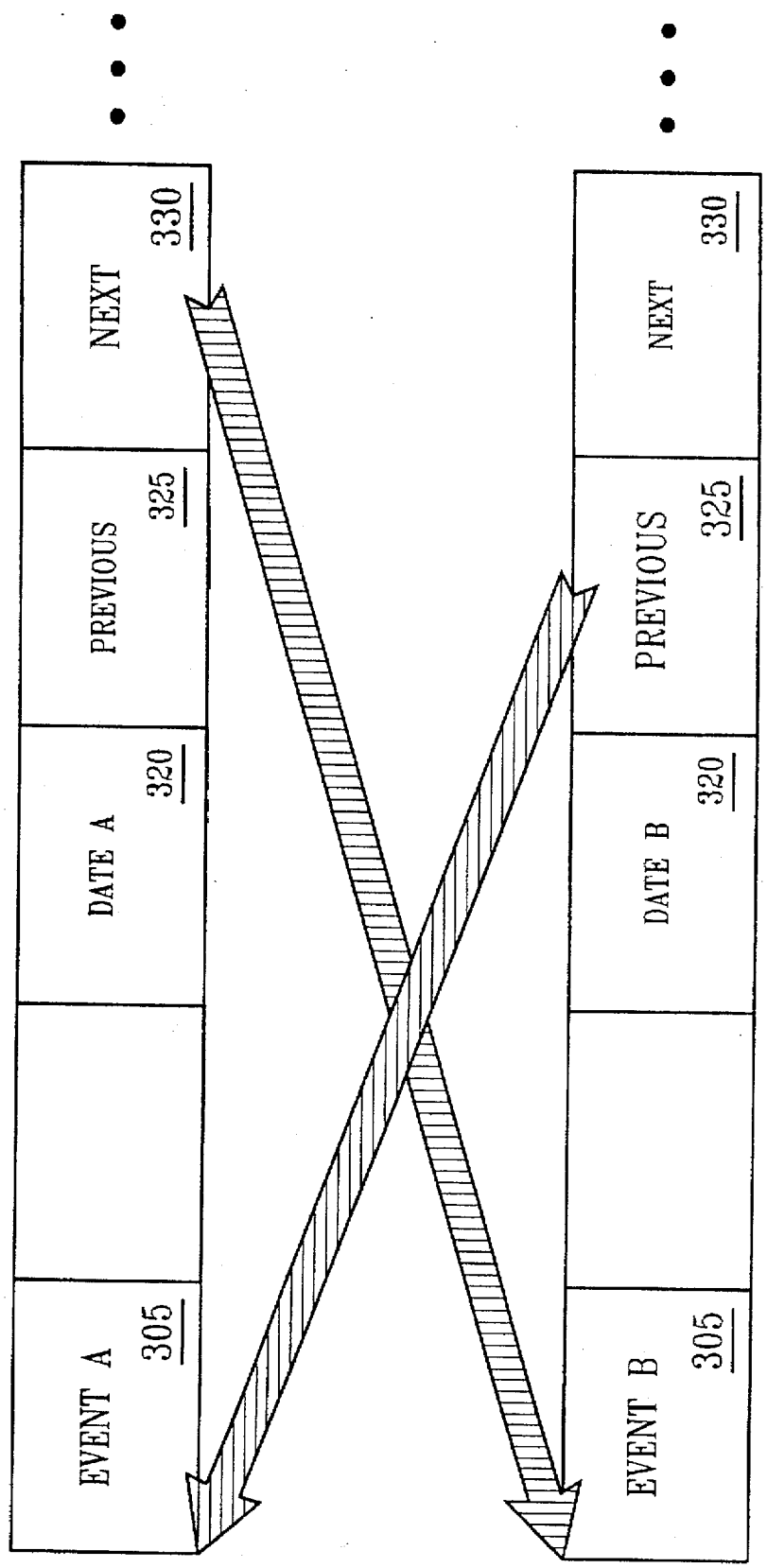
FIG. 4 is a block diagram showing an event group with two sequentially scheduled events.

FIG. 4 illustrates how two events are linked in a precedence/subsequence link. An event can contain pointer (s) to immediately previous events (325) and to immediately following events (330). In FIG. 4, the event A block 330 points to the event B, and the event B block 325 points to the event A. Because the date fields of each event (320) contain a date rather than null, this figure shows events which have been scheduled. Thus, the figure shows blocks 325 and 330 forming a precedence/subsequence link between two events that have been scheduled by the user at the schedule time. (It is important that this link between the two events remains so that if an external dynamic condition occurs which causes an adjustment to the start date, e.g. rescheduling (e.g. postponing) the event, or canceling of an event, the invention can locate any subsequent events that require propagation of the event rescheduling or cancelation). See the description of FIG. 7 for an explanation of how events and event groups are cancelled, altered, postponed, and modified before performance.

Figure 5:
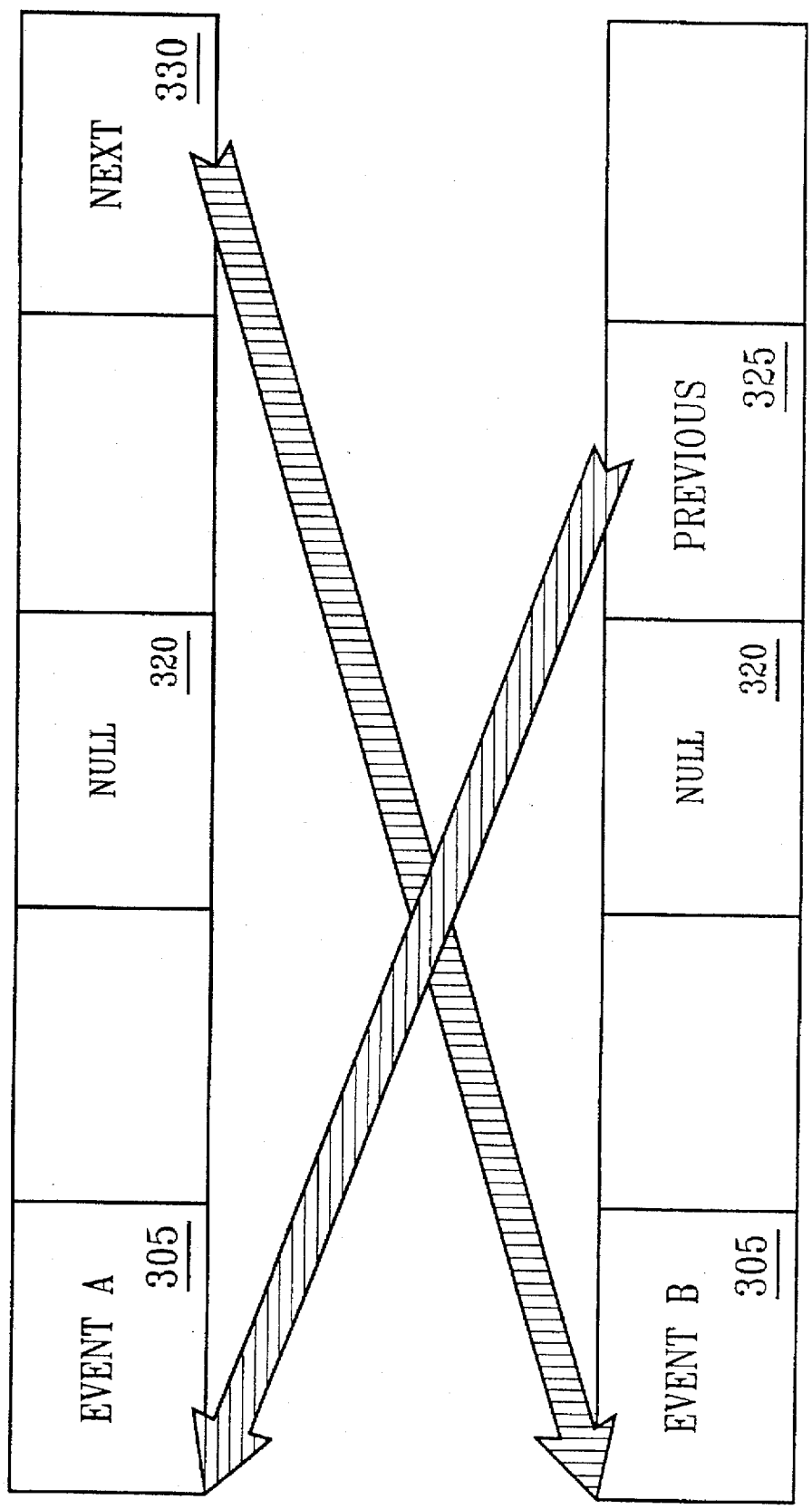
FIG. 5 is a block diagram of a template of an event group.

FIG. 5 shows blocks 325 and 330 forming a precedence/subsequence link between two events in a template. For templates, some information is missing, at a minimum, the start dates. Here, the date blocks (320) of the events are null, which is why these linked events must be a template. Block 330 of event A points to the event B, which follows event B. Block 325 of the second event points to the first event, which precedes it.

Figure 6:
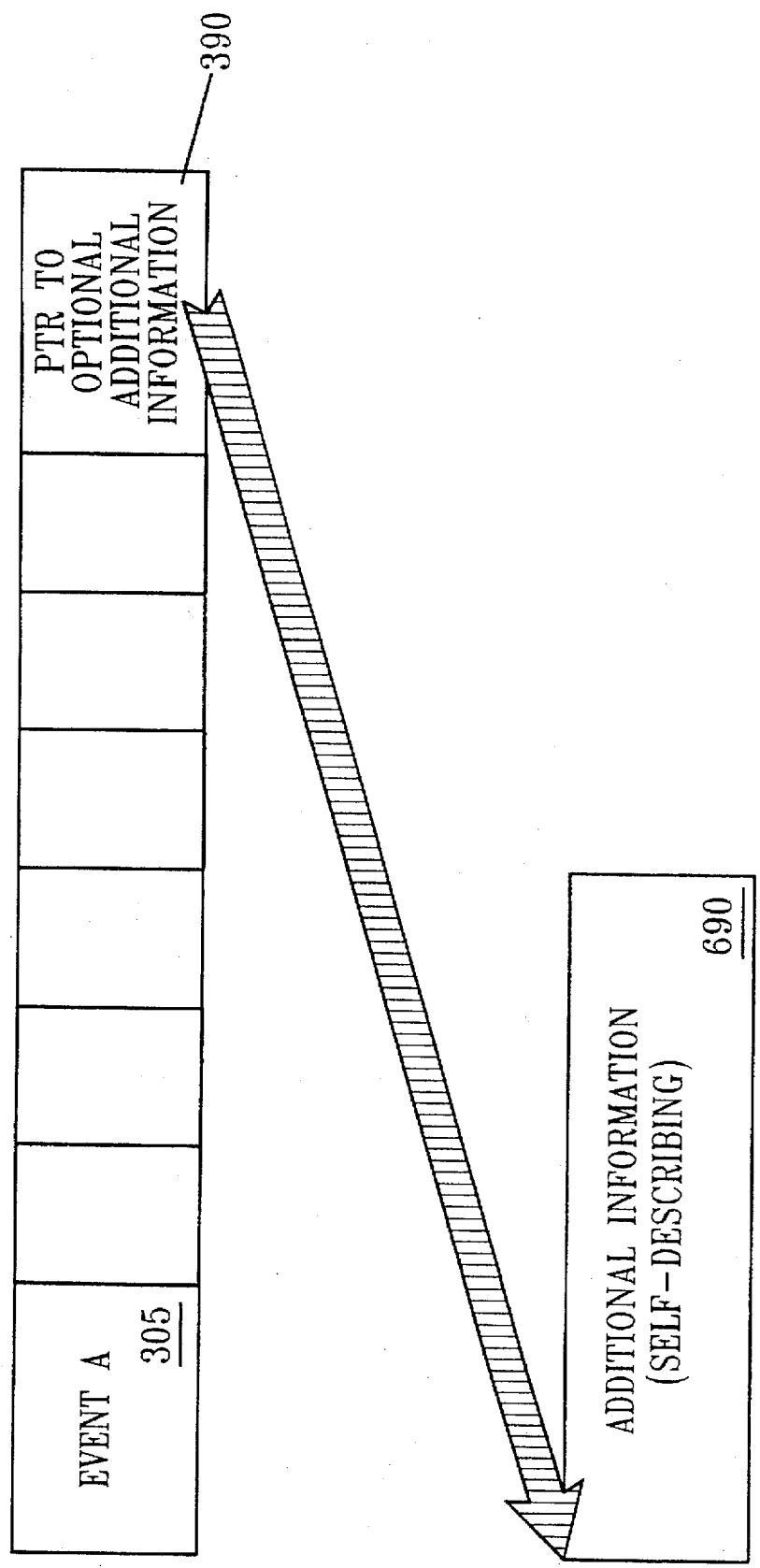
FIG. 6 is a block diagram of an event with a pointer to additional information.

FIG. 6 shows an event that has additional information associated with it. This information can be used by one or more external condition rules and which may in turn be modified by one or more adjustment rules. See the description of FIGS. 7 and 10. The format, contents, quantity etc. of the additional information is highly application dependent, and therefore, it can appear in a separate data structure with self-describing headers. FIG. 6 shows the use of the event's block 390 to point to optional additional information.

Figure 7A:
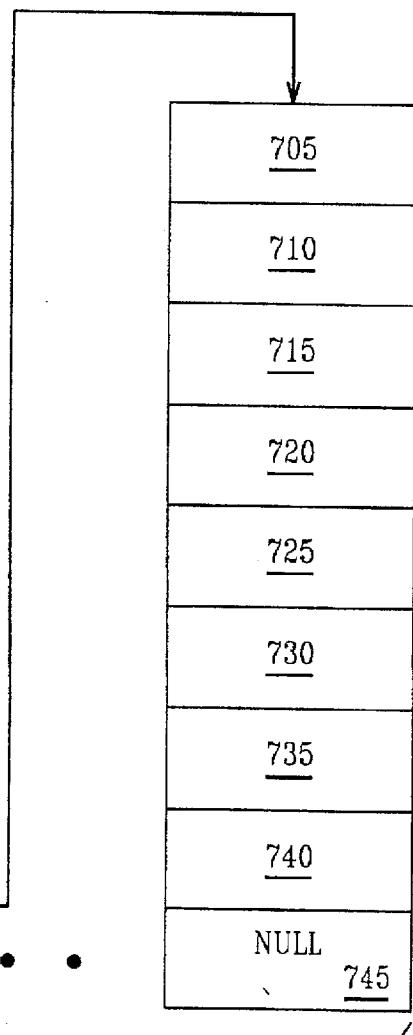
FIG. 7 comprises FIGS. 7A and 7B and is a block diagram of a data structure(s) (FIG. 7A) of an event condition and associated adjustment rules with an example (FIG. 7B).
Figure 7B:
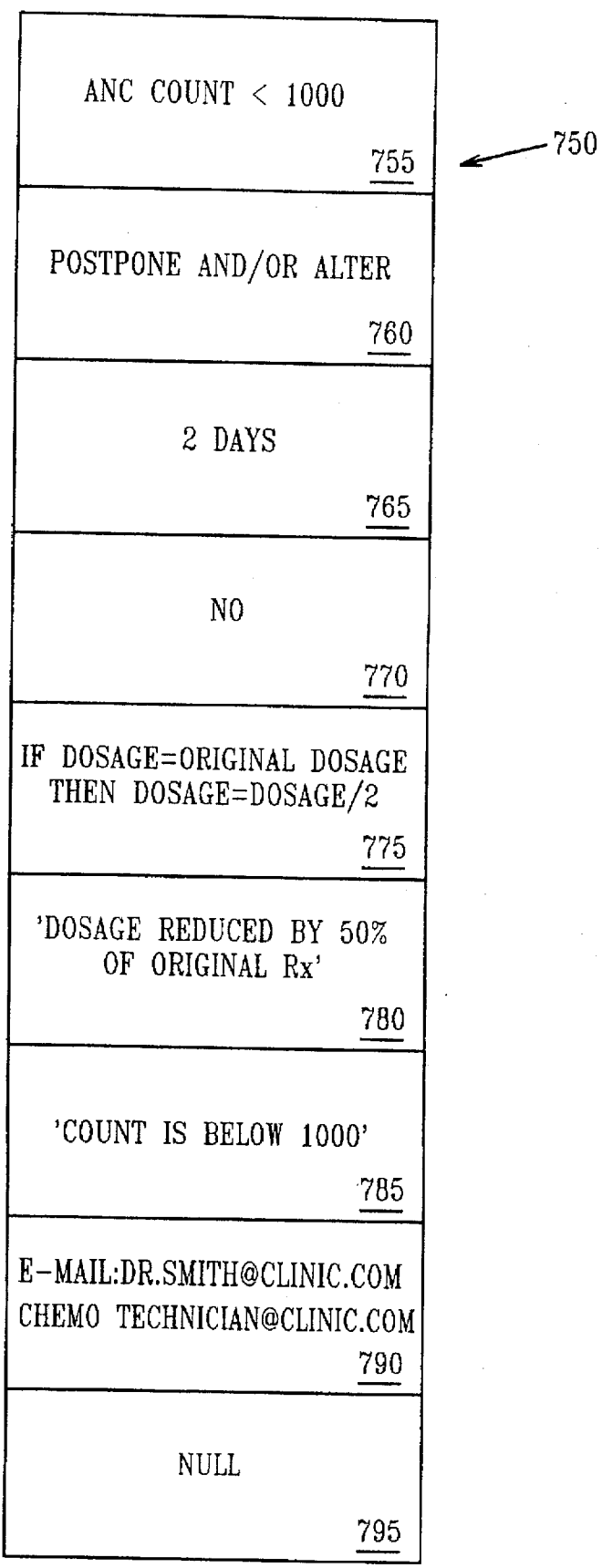

FIG. 7, comprising FIGS. 7A and 7B, is a block diagram of preferred a data structure (FIG. 7A) of an event condition and associated adjustment rules with an example (FIG. 7B).

Figure 12A:
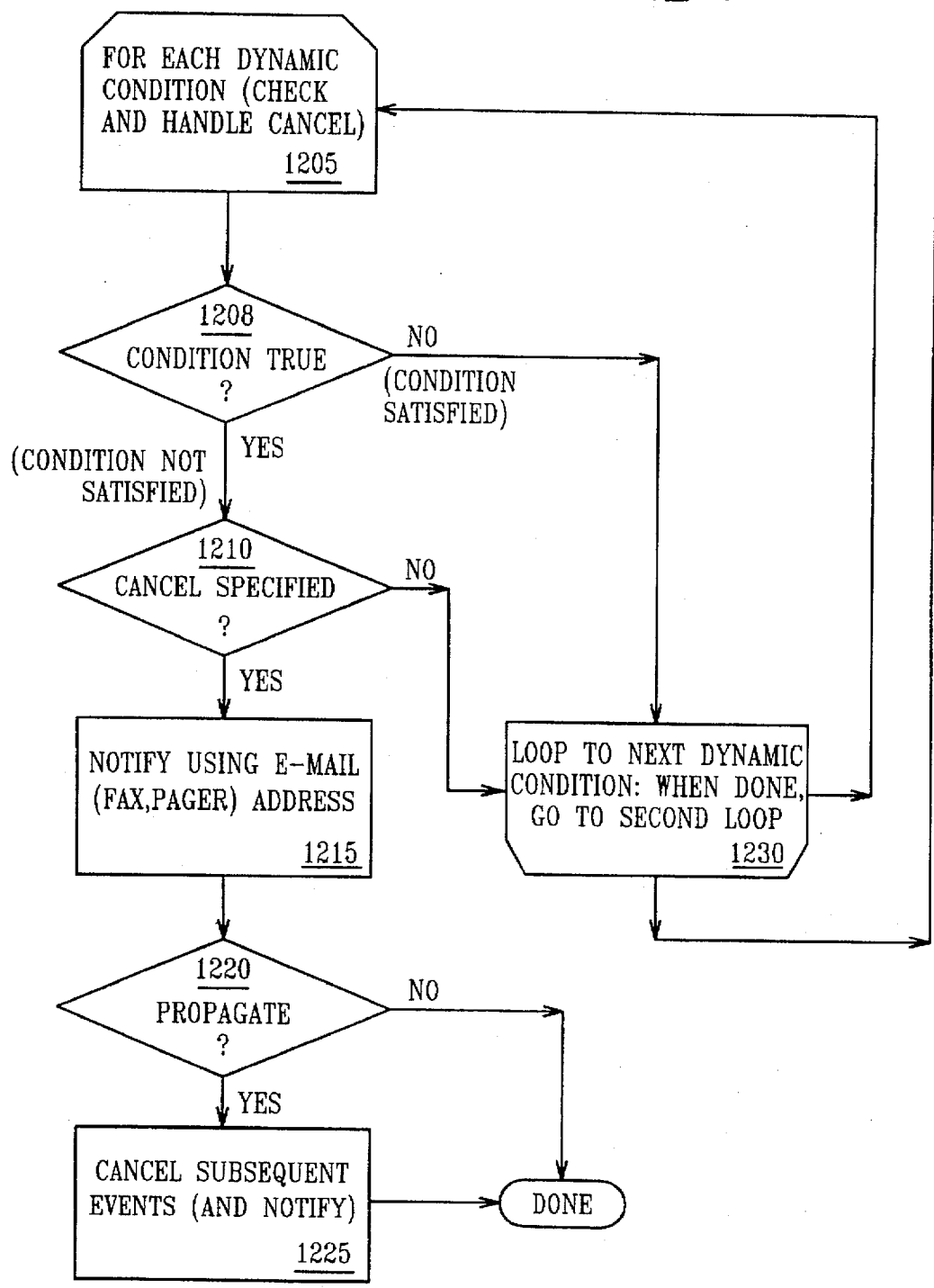
FIG. 12 is a flow chart showing the steps performed by the system at event when checking external conditions.
Figure 12B:
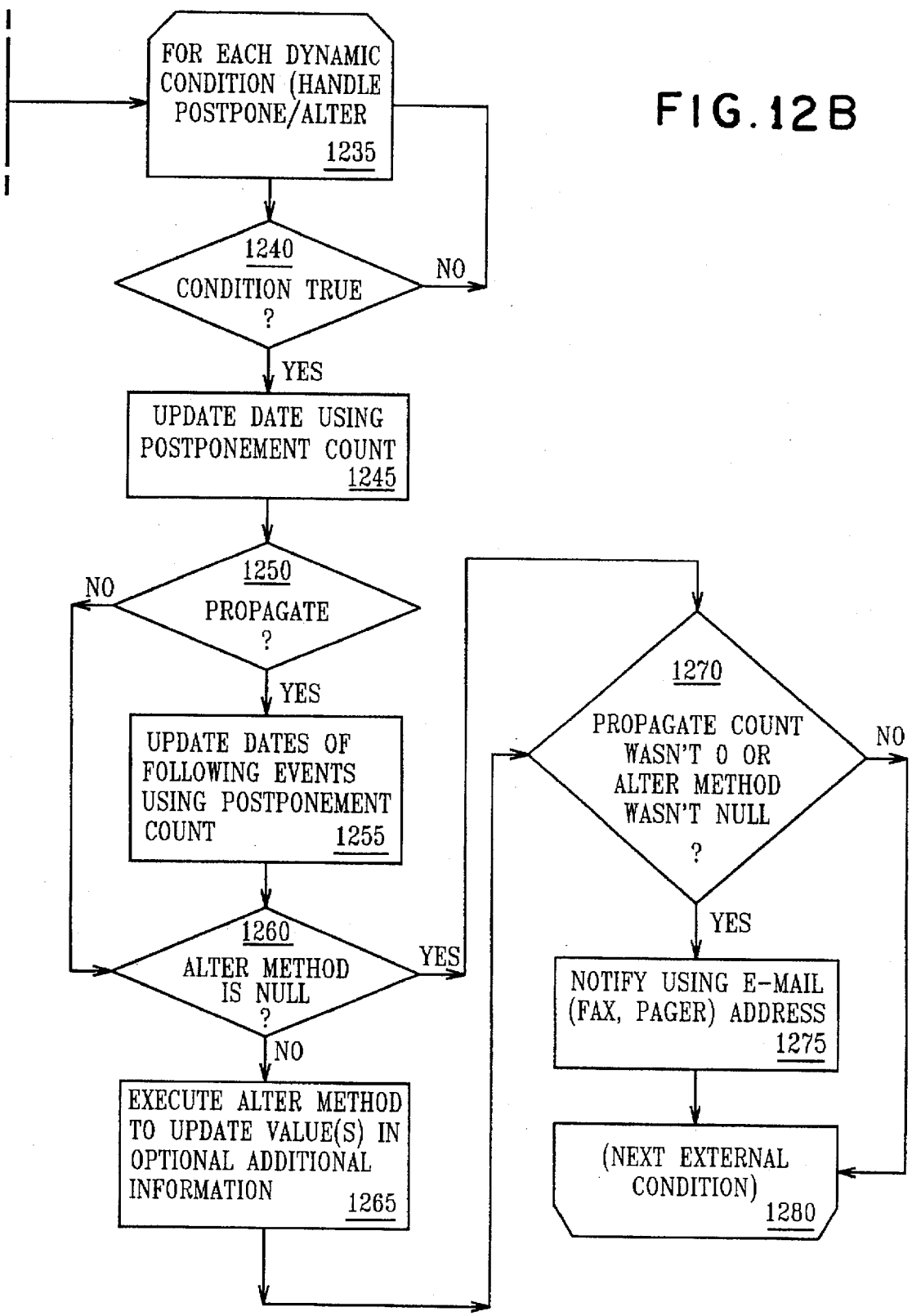

In FIG. 7A, one preferred embodiment of external condition (dynamic condition) and adjustment rule structure 700 includes 9 fields. One structure 700 exits for each dynamic condition 350 placed on the event 210. Therefore, a set 701 of zero or more rule structures 700 can exist for each event 210. FIG. 12 explains how these are used in detail, but generally, if a condition is not met for performing an event, an adjustment rule is applied. These structures are the dynamic conditions pointed to in block 350 of the event structure 210A.

In a preferred embodiment, block 705 contains a function or program, which preferably has a boolean result, using one or more values from the optional additional information block 690. The (boolean) function or program 705 computes a result (true or false) using one or more values from the optional additional information (block 690) linked to the event. In a preferred embodiment, e.g. the condition is satisfied, the result is false, and this adjustment rule will not be applied.

The adjustment type block 710 specifies whether the event should be Canceled or Postponed and/or have its parameters altered when the function evaluates to true; i.e., the condition is not satisfied. These changes 272 occur on the schedule before and/or at the performance time, at prepare to perform time (252, 258).

The postponement count block 715 is used when block 710 specifies Postpone/Alter. This count specifies the number of days that the event should be postponed by. (In this disclosure, postpone is used to mean reschedule, i.e., advancing or delaying the event in time on the calendar 250.)

The propagate postponement or cancel to linked events flag block 720 indicates whether events that are linked as subsequent events to this event should also be postponed or cancelled.

The alter method block 725 is used when block 710 specifies Postpone/Alter. It specifies modifications to one or more of the values in the optional additional information linked to the event.

The description of alter method block 730 points to text that describes in natural language what the alter method does. This text can be used to send messages, like a notification, to the user.

The description of condition block 735 points to text that describes in natural language what the condition is. This text can be used to send messages, like a notification, to the user.

The addresses to notify block 740 points to zero, one, or more addresses, which are e-mail addresses, fax numbers, pager numbers. A natural language notification is sent to each addressee when the condition was true, specifying the condition (using block 735), and the action taken (as specified in block 710 and block 730). These notifications can also be other types of messages, e.g., a message sent over a network from one computer to another.

The pointer to next external condition and adjustment rule block 745 points to another external condition and adjustment rule structures, if more than one condition/rule structure is associated with this event. Otherwise, this field contains null.

FIG. 7B has an example of an external condition structure linked to an event for administering Prednisone chemotherapy to patient Jimmy Smith on Nov. 4, 1994. The Patient's name and ANC count (a blood count) and the Original Dosage prescribed by the doctor, and the Dosage to be administered (which start out the same), are all fields in the optional additional information linked to the event. Dr. Smith is the patient's physician.

The (boolean) function or program using one or more values from the optional additional information block 755 specifies that if the value of the patient's ANC count is less than 1000, the adjustment should be made, i.e., apply the adjustment rule. Since the value of the patient's ANC count changes from day to day and is outside the scheduling system, this is a dynamic (external) condition.

The adjustment type block 760 is to Postpone and/or Alter.

The postponement count block 765 is 2 days.

The propagate postponement or cancel to linked events flag block 770 indicates No. Therefore, no events linked to this one will be cancelled, postponed, and/or altered.

The alter method block 775 specifies that, in addition to the postponement, the dosage should be reduced to half of the Doctor's prescription.

The description of alter method block 780 is an English description of the alter method: 'Dosage reduced by 50% of original Rx'.

Description of condition block 785 is an English description of the condition: 'Count is below 1000'.

Addresses to notify block 790 contains two e-mail addresses, one for the patients physician and one for the technician who administers chemotherapy: DrSmith@clinic.com and ChemoTechnician@clinic.com. Each will receive a message, with text such as the following: Patient: Jimmy Smith—Prednisone postponed by 2 days until Nov. 6, 1994 and Dosage reduced by 50% of original Rx because ANC Count is below 1000.

The pointer to next external condition and adjustment rule block 795 contains null because the low ANC count is the only condition specified. For this event, there is one rule in the rule set 701.

Examples of dynamic conditions 350 that may be used to cancel 710 an event 210 include: safety concerns, or lack of resources to complete something which should not be left in an intermediate state. Examples of dynamic conditions 350 that may be used to postpone an event 210 include: unfavorable conditions that are likely to clear up in a known amount of time. Examples of dynamic conditions 350 may be used to alter aspects of an event 210, like the location, quantity, and duration, when the formula for doing the alteration can be specified ahead of time.

Figure 8:
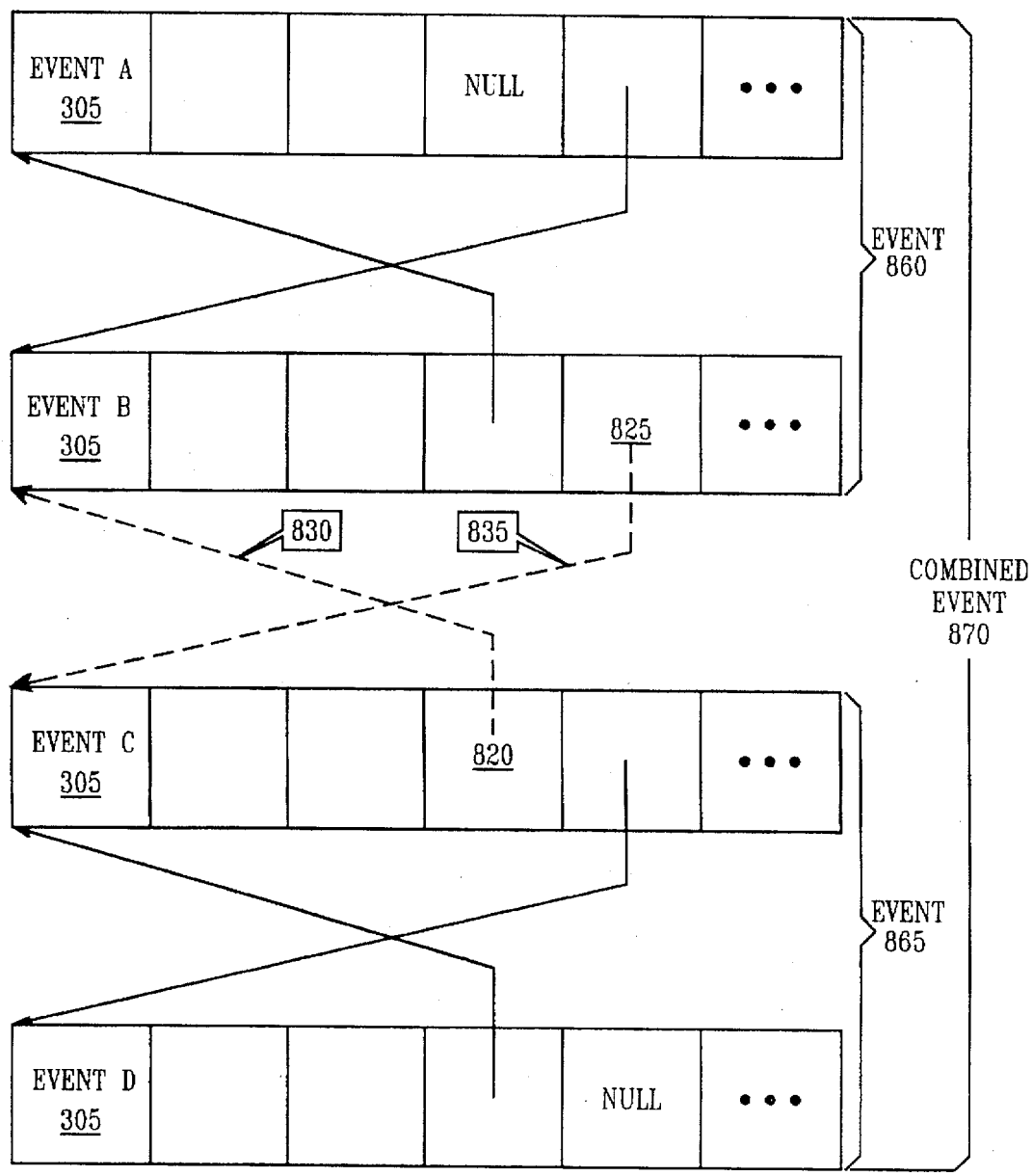
FIG. 8 is a block diagram showing two event chains being connected.

FIG. 8 is a block diagram showing two event chains being connected. Chaining can be used to build event groups 260 from events 210 and/or other event groups 260. Another use of chaining is to related, e.g., in time, two or more events 210 and/or event groups 260. Setting block 825 (the followed by field of the last event of the first event chain) and block 820 (the preceded by field of the first event of the second event chain) forms a single set of four linked events.

In the medical domain, this can be used when the physician wants two treatment sequences to occur one after the other. In the construction domain, this can be used when a protocol for upgrading wiring and plumbing is to be followed by a protocol for painting and cleaning.

This linking would occur based on user input; it is not automatic.

FIG. 9 is flow chart showing the steps performed by the system at scheduling time to schedule an event group 260 or event 210.

When an event group 260 is scheduled, a date 256 is set for each event 210 in the group. Depending upon the implementation, the date 256 used is supplied by a user through the calendar software application. The event group header points to all the first events in the group, (block 1104 in FIG. 11) and some of these first events may have linked events (event chains) which follow them. The date on which the event group is to start is used to set the dates 256 of all the first events, e.g., event 1 210. See block 905. (Blocks 1107 and 1113 are set in FIG. 11).

For each first event 210, block 906, subsequent linked events 220 will be scheduled as follows: The first event 210 is treated as the current event, block 910, and if there is a next event 915, the date for that next subsequent event 220 will be set (block 920; see FIG. 10 for the details). Then the system makes this newly schedule 276 event the current event 210, block 925, and sees if it has a next event 220, block 915. If it doesn't, the system has completed scheduling a set of linked events. Once every chain 870 of events that started with a first event 210 has been completely scheduled 256, 277 (930), the entire group of events has now been scheduled, block 935. However, if there are more events or chains of events to schedule (930) in the event group, the process is repeated starting at step 906. Note, in parallel processing systems, two or more of the first events of an event group can be processed (900) in parallel.

Figure 10A:
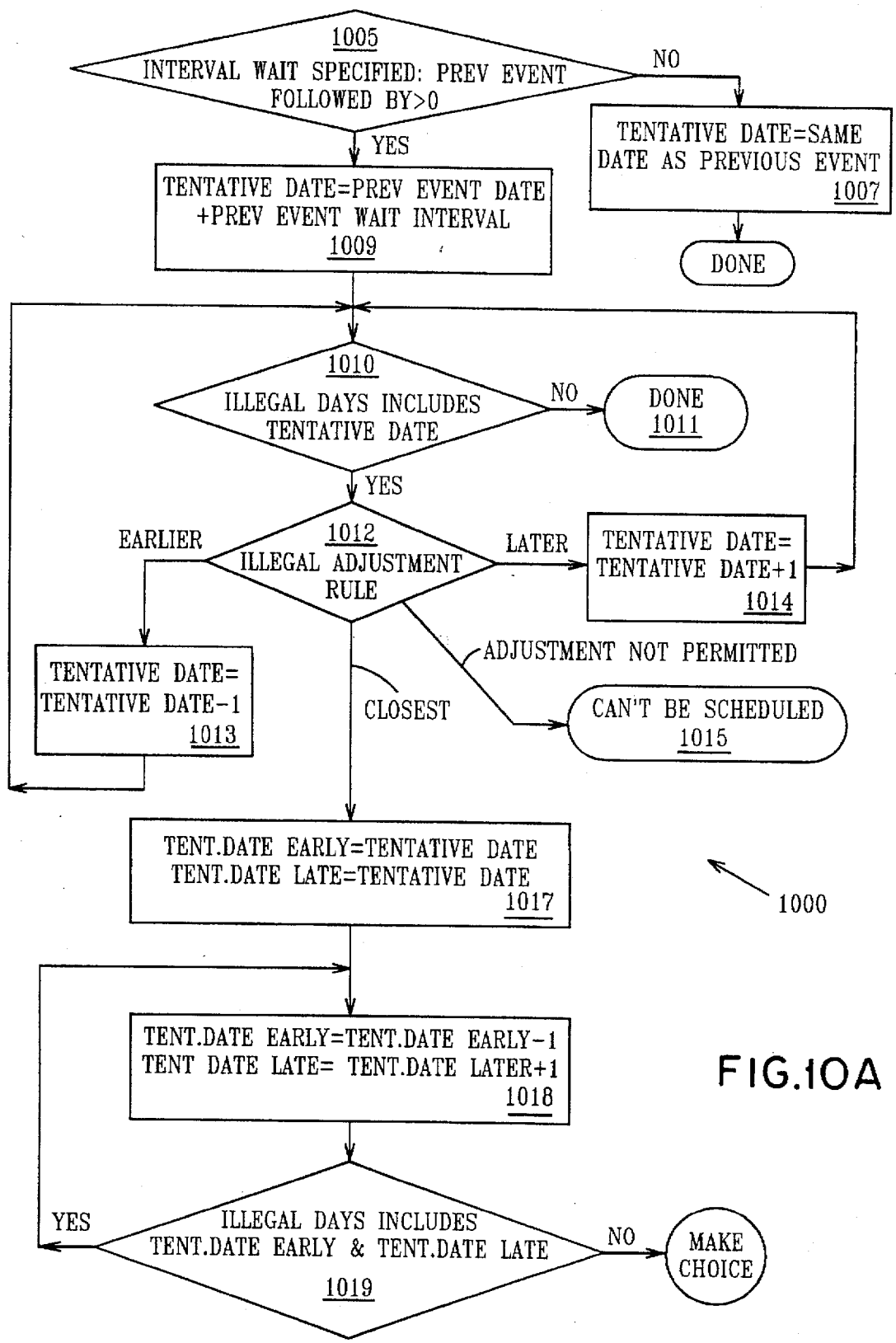
FIGS. 10A and 10B, is a flow chart showing the steps of setting the event date at schedule time.
Figure 10B:
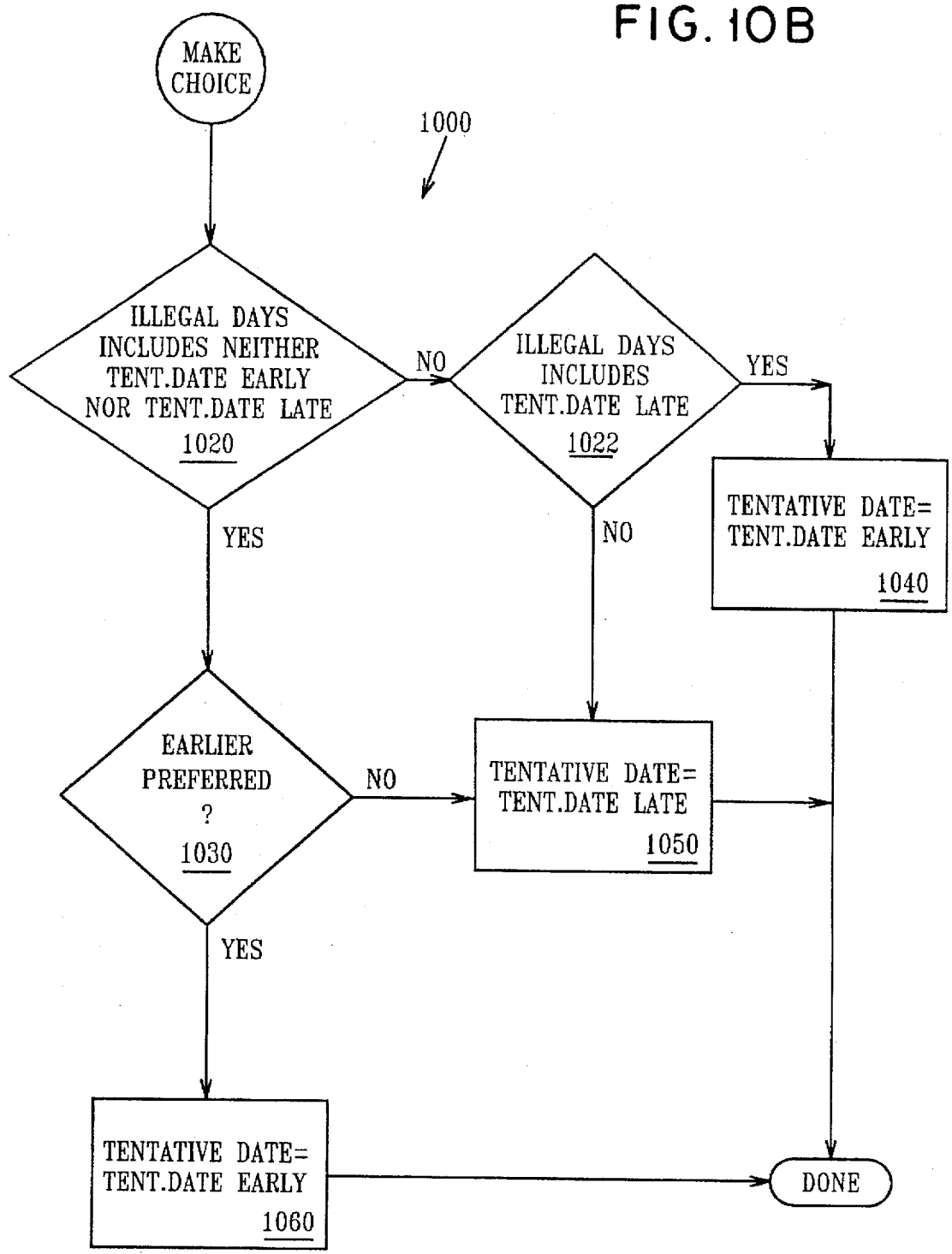

FIG. 10 is a flow chart showing the steps of setting the event date at schedule time for a linked event 220 (one part of a precedence/subsequence chain). This is the process 1000 performed in block 920.

In block 1005, the wait interval (235, 355) of the first event 210 is checked. If the wait interval is zero (0), then the(se) event(s) will be scheduled on the same date 256 as the first event, block 1007. This could occur with an event group that says "Take Medicine A and then take Medicine B". In an event group representing "30,000 mile service for automobile type xxx", there might be a preceding event saying "Drain Oil" followed by an event with no time delay saying "Change Oil Filter".

If the first and following events are linked with a non-zero interval wait, a tentative date to schedule the event is computed, in block 1009, by using the interval wait (block 355) from the previous event and adding it to the schedule date of that event (block 320).

This tentative date is checked against the group of fixed conditions called illegal days, (block 335) block 1010. If there is nothing illegal about performing that event on that day (block 335), the tentative date is used as the scheduled date for the following event 1011.

Otherwise, the event structure 210A is used to indicate a illegal adjustment rule or that the interval wait must be followed exactly, (block 340). If no adjustment is permitted, the program cannot schedule these linked events, block 1015. At this point in the schedule time, a signal can be sent to the user.

Based on which illegal adjustment rule 340 was specified, block 1012, the program will either do the event slightly earlier than the suggested interval, by backing up the tentative date, block 1013, or do the event slightly later than the suggested interval, by advancing the tentative date, block 1014. In any case, this adjusted tentative date is again checked against illegal days, block 1010, so that the program may back up or advance until a suitable date is found. If the adjustment rule 340 specifies a "closest early (later) date, control passes to box 1017.

The illegal adjustment rules 340, known as CLOSEST-PreferEarly and CLOSEST-PreferLate determine two tentative dates, a tentative date earlier than the interval suggests, and one later, block 1017. Each is shifted in block 1018, a day earlier and a day later, and if these two days are both not legal, block 1019, the system will continue looking at dates even earlier and later.

If both days (closest early/later) are permitted, two choices are possible. If CLOSEST-PreferEarly was specified, block 1030, we chose the tentative date early, block 1060. If CLOSEST-PreferEarly was not specified, block 1030, the tentative date late, block 1050, is chosen.

If one but not both was illegal then block 1022 identifies the one that was permitted and then the tentative date early, block 1040, is chosen if it was permitted; or the tentative date late, block 1050, is chosen if that date was permitted.

In a preferred embodiment of medical care, the linked events could be "Injection #1" followed 9 days later by "Booster Injection". If the 9 days must be followed exactly, and injections cannot be given on Saturdays and Sundays, which are illegal days, then the process 1000 will not schedule the sequence 1015 to begin on Thursday or Friday. If the 9 days is actually 9 days or longer, the "Booster Injection" adjustment rule would be SCHEDULE LATER 1012, 1014. Injection #1 could be scheduled for Thursday or Friday, with the Booster Injection scheduled for Monday of the second week following. If the 9 days is actually "no later than 9 days", the adjustment rule would be SCHEDULE EARLIER 1012, 1013. Injection #1 could be scheduled for Thursday or Friday, with the Booster Injection scheduled for Friday of the week following. If the 9 days is actually "roughly 9 days later, but better to err on the early side", the adjustment rule would be CLOSEST-PreferEarly 1030, 1060. Injection #1 could be scheduled for Thursday, with the Booster Injection scheduled for Friday of the week following. Injection #1 could be scheduled for Friday, with the Booster Injection scheduled for Monday of the second week following.

In an alternative embodiment, suppose that an item was purchased and 2 payments are to be electronically transferred from the buyers bank to the sellers account. The second payment must arrive 30 days after the first. There is a penalty for late payment, and suppose that transfers cannot be performed on weekends. If the first payment is scheduled for Friday Dec. 2, 1994, the second payment event indicated a tie-break method of SCHEDULE EARLIER, the illegal days are Saturdays and Sundays, and the first payment event indicated an interval wait of 30 days. Block 1005 would not find a wait of 0. Block 1009 would set the tentative date to Jan. 1, 1995, 30 days later. Block 1010 would see that this is a Sunday, an illegal day. Block 1012 would look at the tie-break method and go to Block 1013 which would adjust the tentative date to Dec. 31, 1994. Block 1010 would see that this is a Saturday and is illegal. Block 1012 would look at the tie-break method and go to Block 1013 which would adjust the tentative date to Dec. 30, 1994. Block 1010 would see that this is a Friday and is permitted. Thus the second payment would be scheduled for Dec. 30, 1994.

FIG. 11 is a block diagram of an example event group 1100 showing linkages. Linkages (1180, 1181, 1183, 1188) between the events (1110, 1130, 1150, 1190) and the event group header (1105) are shown. Linkages between a chain of events (1184, 1185, 1186, 1187) are shown. In this example, the event group is for a chemotherapy sequence in which Prednisone will be administered on Mondays 1110, Wednesdays 1130, and Fridays 1150, and Vincristine (1190) will be administered on Mondays, the entire sequence taking 10 weeks.

The event group header 1105 comprises the identifier field 1102, the description field 1103, and the field that points to all the first events of the group, field 1104. In this case, field 1104 points (1180) to the Prednisone on Mondays event (1110) and points (1181) to the Vincristine on Mondays event 1190). The ten week repetition is specified by fields 1121–1123, 1141–1143, 1161–1163, for Prednisone (Monday through Wednesday, respectively) and 1171–1173 for the Vincristine.

Fields 1170 and 1118 suggested that the protocol be started on a Monday. The entire protocol has been scheduled to start on Oct. 3, 1994, and the process 1000 in FIG. 10 was used to insert the start dates for the Prednisone on Wednesday (field 1133) and on Friday (field 1153). The process 1000 used the followed by fields 1114 and 1135 and the interval wait fields 1120 and 1140. Fields 1134 and 1154 also link the three Prednisone events. Field 1126 links (1183) the Prednisone events back to the event group header 1105; field 1110 does the same for the Vincristine event.

Fields 1125, 1145, 1165 and 1175 indicate that these events were inserted into this patient's calendar by Nurse Smith.

FIG. 12 is a flow chart 1200 showing the steps performed by the system at event performance time when checking dynamic conditions. This check occurs at the prepare to perform time(s) (252, 258), e.g., just before the event is to occur. Events may contain one or more dynamic conditions and adjustment rules, pointed to by field 350 and expressed in terms of the data pointed to by field 390. The dynamic condition and an adjustment rule pointed to by field 350 is shown in FIG. 7.

There are two passes through all the external (dynamic) condition(s) and adjustment rules. The first pass begins with block 1205 and ends with block 1230, and determines if any condition is true which would cause the event to be cancelled at event performance time.

Block 1208 evaluates the condition (using field 705 and data from 690). If not true, i.e., the condition is satisfied, the system loops to the next condition 1230. If true, the system checks field 710 and if cancel isn't specified 1210, a loop to the next condition is done 1230. If it is specified 1210, fields 740 and 735 are used to notify 1215 appropriate personnel that the event is being canceled and why. Block 1220 checks field 720 and if the cancel is to be propagated, any events linked to this event are also cancelled.

In the preferred embodiment of medical care, the linked events could be "Injection #1" followed 9 days later by "Booster Injection". However, a dynamic (external) condition associated with Injection #1 indicates that neither shot should be given if the patient's temperature is above 99 degrees Fahrenheit. Injection #1's rule has propagate (field 720) as true, and the ptrs to following events (field 330) is used to find and cancel Booster Injection also.

If no dynamic (external) condition that was true had cancel specified, the second pass over the conditions begins at block 1235. Block 1240 bypasses conditions that are not true. Any condition whose boolean is true, i.e., condition not satisfied, must have specified Postpone and/or Alter as the adjustment type (field 710). Block 1245 adds the postponement count (field 715) to the date (respecting illegal days). Block 1250 checks field 720 and if propagate is specified the postponement is propagated by Block 1255.

In the preferred embodiment of medical care, the linked events could be "Injection #1" followed 9 days later by "Booster Injection". However, a dynamic (external) condition associated with Injection #1 indicates that the shot should be postponed (field 710) by 7 days (field 715) if the patient's temperature is below 98 degrees Fahrenheit (field 705). Injection #1's rule has propagate (field 720) as true, and the ptr to following events (field 330) is used to postpone the Booster Injection also.

Block 1260 examines field 725. If an alter method is present, block 1265 executes it, altering values in the additional data field 690.

Block 1270 checks if any actual adjustment took place. If so, block 1275 will will notify appropriate personnel using field 740, and fields 730, 735, 715.

Block 1280 loops back to block 135 to handle the postponement and/or alteration that any second or third condition calls for.

Using the present invention, a domain expert can encode a protocol as a template that includes the logical conditions for performing each of the events of the protocol. The invention allows the template to having missing information that can be provided at a later scheduling time by the domain expert or a person with lesser domain expertise. In this manner, non expert users can schedule protocols that will honor logical conditions, arbitrarily complex event sequences, and event relationships incorporated by the domain expert.

For example, a domain expert might be a preeminent physician that would use the invention to develop a chemotherapy protocol. The domain expert would specify information like drug types, quantities, administration order and logical conditions like waiting times in the template. Then a nurse would use the invention to specify missing information in the protocol like starting date to plan and schedule the chemotherapy for a patient.

Other non limiting applications of the invention include: an engineer domain expert designing a protocol for the manufacture of an article by line workers or by robots; a marketing strategist designing the launch of a new product that has events performed by a telemarketing firm; a loan manager domain expert designing a protocol for for a loan office to implement procedures for granting a mortgage; a project manager domain expert designing a protocol for a project with events that will be performed by a contractor; a chemist domain expert designing a protocol for a process to manufacture a composition of matter; and etc.

Given the present disclosure, other equivalent embodiments of the invention would become apparent to one skilled in the art. These embodiments are also within the contemplation of the inventors.

We claim:

1. A scheduling system for scheduling events, comprising:
   a. a computer with a central processing unit and a memory;
   b. one or more events to be scheduled and each event stored in the memory as an event data structure, one or more of the events having one or more event conditions, the event conditions defined in the respective event data structure and the event conditions being satisfied before the event can be performed;
   c. one or more links, each link connecting two or more events, each link identified in one or more of the event data structures of the respective events that the link connects and each link establishing sequential relationships between the events that the link connects; and
   d. a scheduler executed by the central processing unit to schedule one or more event groups, each event group having one or more events connected by one or more of the links, the scheduler scheduling the event group only if all of the event conditions in the event group are satisfied.

2. A scheduling system, as in claim 1, wherein one or more the event conditions is not satisfied, each of the unsatisfied event conditions having an associated adjustment rule, and the associated adjustment rule being applied for each unsatisfied event condition to modify the event so that the event can be performed.

3. A scheduling system, as in claim 2, wherein applying one or more of the adjustment rules alters the event.

4. A scheduling system, as in claim 2, wherein applying one or more of the adjustment rules reschedules the event.

5. A scheduling system, as in claim 1, wherein one or more event conditions is not satisfied and a message is sent to a user.

6. A scheduling system, as in claim 1, wherein the event conditions include one or more fixed conditions and the event is performed by scheduling of the event at an event scheduling time when the fixed conditions are satisfied.

7. A scheduling system, as in claim 1, wherein the event conditions include one or more dynamic conditions and the event is performed by reminding a user of the event at a performance time, the event being scheduled at a schedule time, if the dynamic conditions are satisfied at one or more prepare-to-perform-times.

8. A scheduling system, as in claim 1, wherein the event conditions include dynamic conditions which, if not satisfied at one or more prepare-to-perform-times, cause one or more events to be modified in any one of the following ways: cancel, reschedule, and alter.

9. A scheduling system, as in claim 1, wherein one or more new events can be connected to one or more events in the event group with one or more links.

10. A scheduling system, as in claim 1, wherein two event groups are sequentially connected together by a link to produce a new event group.

11. A scheduling system, as in claim 10, wherein the new event group is scheduled on an electronic calendar.

12. A scheduling system for scheduling events, as in claim 1, wherein the events describe activities in any one of the following domains: finance, accounting, banking, marketing, telemarketing, construction, and manufacturing.

13. A scheduling system for scheduling events, comprising:
   a. a computer with a central processing unit, a memory, and an electronic calendar;
   b. one or more events to be scheduled on the electronic calendar, each event being described in an event data structure stored in the memory, the data structure having one or more event conditions associated with respective event described in the event data structure, the event conditions being zero or more fixed conditions and zero or more dynamic conditions, the fixed conditions being satisfied before the event can be scheduled on the electronic calendar at a schedule time and dynamic conditions being satisfied at a prepare-to-perform-time before the event can be performed at a performance time;
   c. one or more links, each link connecting two or more events, and each link establishing sequential relationships between the events that the link connects and each link establishing an interval wait condition between the evens;
   d. one or more event groups, each event group having one or more events connected by one or more of the links;
   e. a template representation of each of the event groups, the template having one or more variables that include sequential information that defines the sequential relationship of the events, the template further having omitted information; and
   f. a process, executed by the central processing unit, for scheduling every event in a template representation when the omitted information is provided by a user.

14. A scheduling system, as in claim 13, wherein the omitted information is a template start time.

15. A scheduling system, as in claim 13, wherein one or more of the events is associated with event-additional-information about the event.

16. A scheduling system, as in claim 15, wherein the event additional information is operated on by event rules to evaluate a condition.

17. A scheduling system, as in claim 15, wherein the event-additional-information is provided by a user and a notification is given to the user based on the event-additional-information provided.

18. A scheduling system, as in claim 15, wherein the event information is audit information.

19. A scheduling system, as in claim 16, wherein the event additional information includes an event repetition count and an event repetition interval which causes the event to be scheduled the number of times specified by the count, each scheduled time separated by the repetition interval.

20. A scheduling system for scheduling medical events, comprising:
   a. a computer with a central processing unit and a memory;
   b. one or more of the medical events to be scheduled, each medical event stored in the memory as an event data structure and one or more of the medical events having one or more associated medical event conditions, the medical event conditions defined in the respective event data structure and the medical event conditions being satisfied before the medical event can be performed;
   c. one or more links, each link connecting two or more of the medical events, and each link establishing sequential relationships between the medical events that the link connects; and
   d. a scheduler executed by the central processing unit that schedules one or more medical event groups, each medical event group having one or more of the medical events connected by one or more of the links, the medical event group scheduled only if all of the medical event conditions in the medical event group are satisfied.

21. A scheduling system for scheduling events, comprising:
   a. a computer means with a memory means for storing one or more event means;
   b. one or more link means for connecting two or more of the event means, and each link means establishing sequential relationships between the event means that the link means connects;
   c. one or more fixed condition means for permitting one or more of the event means to be scheduled at a schedule time if the fixed condition means is satisfied; and
   d. one or more dynamic condition means for permitting one or more of the event means to be scheduled at a performance time if the dynamic conditions means are satisfied at one or more prepare-to-perform-times.

22. A method executing on a computer for scheduling comprising the steps of:

a. at a schedule time, examining a tentative start time of one or more events, each event being connected to one or more other events by a link, each link establishing a sequential relationship between the events that the link connects, the connected events forming an event group;

b. determining if the tentative start time is an illegal time;

c. if the tentative start time is an illegal time, applying one or more adjustment rules to the tentative start time to produce a new tentative start time;

d. replacing the tentative start time with the new tentative start time;

e. repeating steps b through e until the tentative start time is a legal start time for the event; and f. scheduling the event at the legal start time.

23. A method, as in claim 22, further comprising the following steps:

g. checking, at one or more prepare-to-perform-times, if one or more dynamic conditions associated with one or more of the events is satisfied;

h. if one of the dynamic conditions is not satisfied, determining if the event should be cancelled as specified by the adjustment rules;

i. if the event is to be cancelled, notify a user;

j. if the event is not to be cancelled, rescheduling the event if rescheduling is specified by the adjustment rules;

k. if the event is not to be cancelled or rescheduled, altering the event if altering is specified by the adjustment rules; and l. if the event is not to be cancelled, altering and rescheduling the event if altering and rescheduling is specified by the adjustment rules.

24. A method, as in claim 23, further comprising the step of:

m. propagating the effect of modifying an event through out the event group where the modification to the event includes any one of the following: cancellation and rescheduling.

* * * * *